(12) United States Patent
Mielenz et al.

(10) Patent No.: US 10,605,612 B2
(45) Date of Patent: Mar. 31, 2020

(54) METHOD FOR INCORPORATING A DYNAMIC OBJECT INTO A DIGITAL MAP OF A HIGHLY AUTOMATED VEHICLE (HAV)

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 15/877,443

(22) Filed: Jan. 23, 2018

(65) Prior Publication Data

US 2018/0216944 A1  Aug. 2, 2018

(30) Foreign Application Priority Data

Feb. 2, 2017 (DE) .......................... 10 2017 201 665

(51) Int. Cl.
| | |
|---|---|
| *G06F 19/00* | (2018.01) |
| *G01C 21/32* | (2006.01) |
| *G08G 1/01* | (2006.01) |
| *G08G 1/042* | (2006.01) |
| *B60W 30/095* | (2012.01) |
| *G05D 1/00* | (2006.01) |
| *G06K 9/00* | (2006.01) |
| *G06T 7/20* | (2017.01) |
| *G08G 1/16* | (2006.01) |

(52) U.S. Cl.
CPC .......... *G01C 21/32* (2013.01); *B60W 30/0956* (2013.01); *G05D 1/0088* (2013.01); *G06K 9/00791* (2013.01); *G06T 7/20* (2013.01); *G08G 1/0141* (2013.01); *G08G 1/042* (2013.01); *G08G 1/166* (2013.01); *G08G 1/167* (2013.01); *G05D 2201/0212* (2013.01); *G05D 2201/0213* (2013.01); *G06T 2207/30252* (2013.01)

(58) Field of Classification Search
CPC .. G01C 21/32; B60W 30/0956; G05D 1/0088
See application file for complete search history.

(56) References Cited

U.S. PATENT DOCUMENTS

| | | | |
|---|---|---|---|
| 2017/0205913 A1* | 7/2017 | Kimura | ............... G02F 1/13338 |
| 2018/0216944 A1* | 8/2018 | Mielenz | ............ B60W 30/0956 |

* cited by examiner

*Primary Examiner* — Adam M Alharbi
(74) *Attorney, Agent, or Firm* — Norton Rose Fulbright US LLP; Gerard Messina

(57) ABSTRACT

An evaluation unit obtains from sensors in a roadway surface respective overlap signals (a) transmitted by the sensors via a communications interfaces of the sensors and (b) that include respective identifications of the sensors and information as to whether the respective sensors are currently overlapped by any dynamic objects above the sensors on the roadway surface, where the sensors are associated with respective geographical positions; ascertains a respective position of each of the at least one dynamic object situated on the roadway on the basis of the overlap signals in the form of a local environmental model of the road section; and transmits the local environmental model to the HAV in the form of a digital map identifying the at least one dynamic object at one or more respective positions of the map corresponding to the ascertained at least one respective position.

20 Claims, 3 Drawing Sheets

METHOD FOR INCORPORATING A DYNAMIC OBJECT INTO A DIGITAL MAP OF A HIGHLY AUTOMATED VEHICLE (HAV)

CROSS-REFERENCE TO RELATED APPLICATIONS

The present application claims priority under 35 U.S.C. § 119 to DE 10 2017 201 665.5, filed in the Federal Republic of Germany on Feb. 2, 2017, the content of which is hereby incorporated by reference herein in its entirety.

FIELD OF THE INVENTION

The present invention relates to a method for incorporating a dynamic object into a digital map of a highly automated vehicle (HAV). In addition, the present invention relates to a motor vehicle and to a computer program.

BACKGROUND

In view of the increasing degree to which vehicles are automated, driver-assistance systems of ever increasing complexity are being used. Driver-assistance systems and functions of this type, such as highly automated driving or fully automated driving, require a large number of sensors in the vehicle that allow for an exact detection of the vehicle environment. In the following text, "more highly automated" refers to all degrees of automation that correspond to an automated longitudinal and transverse guidance with increased system responsibility within the definition of the Bundesanstalt fur StraBenwesen (BASt) (Federal Institute for Road Management), e.g., partially automated, highly automated, or fully automated driving. In order to control a motor vehicle in such a more highly automated manner, it is necessary, for instance, to locate the motor vehicle itself, to guide it in a preferred traffic lane, and to execute driving maneuvers such as a parking maneuver within a parking lot.

Various possibilities for carrying out such a localization are known from the related art. In the case of parking lots, for example, the occupancy status is able to be transmitted via radio to a server after a further dynamic or static object has been localized on a digital map of a highly automated vehicle (HAV), for instance using surface-integrated magnetic-field sensors.

It is furthermore known that a representation of the vehicle environment, referred to as an environmental model, is able to be set up using different vehicle-internal ambient-environment sensors such as radar sensors, cameras, driving-dynamics sensors, GPS (global positioning system) and/or digital maps. The highest priority in this context is the achievement of greater accuracy and safety as well as the achievement of a larger visual range in comparison with individual data sources.

SUMMARY

An objective of the present invention is to provide an improved method for incorporating a dynamic object into a digital map of a highly automated vehicle (HOV) in order to improve the detection of dynamic objects in the environment.

According to an example embodiment of the present invention, a method for incorporating at least one dynamic object into a digital map, in particular a localization map of a highly automated vehicle (HOV), includes: placing a defined number of sensors in a road surface of a road section that dynamic objects can use for driving, the sensors in each case having a communications interface and being designed to transmit an overlap signal that includes an identification of the sensor and information as to whether or not the sensor is currently overlapped by at least one dynamic object that is situated above the sensor on the roadway surface; ascertaining the geographical position of each sensor and allocating an unequivocal identification to each sensor in such a way that each sensor as well as its position are clearly identifiable on the basis of its respective overlap signal; transmitting the overlap signals to an evaluation unit; ascertaining at least the position of the at least one dynamic object located on the roadway on the basis of the overlap signals using of the evaluation unit in the form of a local environmental model of the road section; transmitting the local environmental model to the HAV in the form of a digital map; and localizing the at least one dynamic object using the digital map.

"Dynamic objects" within the scope of this application are to be understood as mobile objects taking part in road traffic, for example, trucks, motor vehicles, motorcycles, and/or bicycles.

According to one example embodiment, the sensors are surface-integrated magnetic-field sensors.

In an example embodiment, the communications interfaces of the sensors are developed in the form of wireless interfaces, in particular in the form of radio interfaces, Bluetooth interfaces, WLAN interfaces, and/or infrared interfaces.

Preferably, at least two of the sensors are placed at a defined distance one behind the other when viewed in the longitudinal direction of the road section.

An example embodiment of the present invention thus provides a method for localizing at least one dynamic object on a digital map or a map of at least a highly automated vehicle (HOV) that ascertains the position of the dynamic object on a digital map using a defined number of sensors in a roadway surface. The sensors are installed lengthwise on a roadway surface, at certain intervals one after the other, for the purpose of ascertaining the velocity of dynamic objects and to use it to predict the dynamic objects in the server, for instance. The required data are obtained with the aid of magnetic-field sensors installed in the ground, which are able to be identified in an unequivocal and geo-referenced manner, so that a connected server is able to unequivocally allocate the data to a road map.

In an advantageous example embodiment, the movement trajectories of the dynamic objects located on the road section are calculated in advance in space and time on the basis of the velocity conditions of the dynamic objects located on the road section, while taking into account a known course of the road section, its subdivision into traffic lanes, and also the applicable traffic rules at that location.

This achieves the particular technical advantage that dynamic objects are incorporated into a local environmental model and their behaviors are able to be predicted from digital maps on the basis of recorded velocities and road courses. This information is transmittable to the at least one HAV via the communications interfaces. The synchronization is performed through geo-referencing in the server.

The movement trajectories of the dynamic objects located along the road section are preferably incorporated into the environmental model.

In an especially advantageous example embodiment, the road section is located in the region of a traffic node.

As an alternative, the road section is located in the region of an intersection, a pedestrian crosswalk, an entry ramp to a highway, or in the region of an exit.

The installation of sensors according to the present invention in a road section in the region of traffic nodes, which often also feature complex visual conditions, makes it possible for an HOV to also have further expanded environmental information at its disposal via the vehicle-internal sensors.

According to an advantageous example embodiment, the evaluation unit is a mobile edge computing server, the mobile edge computing server being stationary, in particular.

In an advantageous example embodiment, the localization of the dynamic object furthermore takes place using vehicle-internal sensors that are mounted on the HAV.

Example embodiments of the present invention are directed to a computer program, which includes a program code for executing the method according to the described example embodiments when the computer program is running on a computer.

The approach according to the present invention provides the particular technical advantage of improving the robustness and/or the accuracy in the localization of a dynamic object because vehicle-internal ambient-environment sensors augment the information. Another advantage, especially in overlap situations, is that the information according to the present invention can be the only environmental observations, so that a system termination would have to take place without these observations and the HAV would thus no longer be able to drive autonomously.

Vehicle-internal ambient-environment sensors include one or more ambient-environment sensors. Within the meaning of this invention, an ambient-environment sensor describes, for example, one of the following ambient-environment sensors: a radar sensor, lidar sensor, video sensor, laser sensor, ultrasonic sensor, and magnetic sensor.

Although the present invention will be described predominantly in connection with passenger cars in the following text, it is by no means limited to such cars but can be used in any type of more highly automated vehicle such as trucks and/or passenger cars.

Additional features, application options, and advantages of the present invention result from the following description of exemplary embodiments of the present invention, which are illustrated in the figures. It should be noted that the illustrated features are merely of descriptive character, can also be used in combination with features of other aforedescribed further developments, and are not meant to restrict the present invention in any shape or form.

In the following text, the present invention is described in greater detail on the basis of preferred exemplary embodiments, and matching reference numerals have been used for the same features.

DETAILED DESCRIPTION

Figure 1:
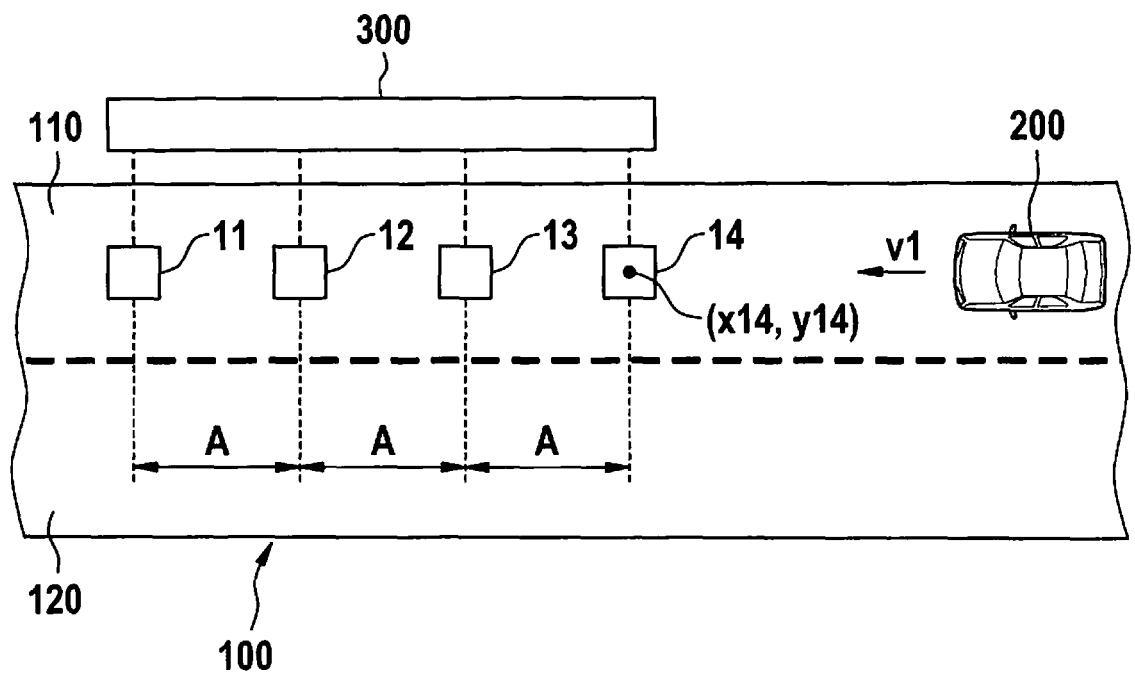
FIG. 1 is a view of a road section in which the method according to the present invention is used, according to an example embodiment of the present invention.

FIG. 1 shows a road section 100 in which the method according to the present invention for incorporating at least one dynamic object 200 is used, according to an example embodiment. Road section 100 has traffic lanes 110 and 120, and dynamic object 200 travels in traffic lane 110 at a specific speed and in a direction symbolized by arrow v1.

A defined number of sensors, in this exemplary embodiment the four sensors 11, 12, 13, 14, are disposed in the road surface of traffic lane 110. Sensors 11, 12, 13, 14 are set apart from one another at a defined spacing A. In this particular example, spacing A is always identical. However, a variable spacing A between the sensors is also conceivable.

Each sensor 11, 12, 13, 14 has its own communications interface (not shown), via which said sensor 11, 12, 13, 14 transmits an overlap signal to an evaluation unit 300, which is likewise equipped with a communications interface (not shown) for this purpose, such as a radio interface. In FIG. 1, the overlap signals of sensors 11, 12, 13, 14 are illustrated by dashed lines to evaluation unit 300. On the one hand, the overlap signals include an identification (ID) of respective sensor 11, 12, 13, 14, by which the respective overlap signal is unequivocally able to be allocated to one of sensors 11, 12, 13, 14. On the other hand, the overlap signals include the information as to whether or not respective sensor 11, 12, 13, 14 is currently overlapped by a dynamic object that is located above sensor 11, 12, 13, 14 in the road surface of traffic lane 110.

The communications interfaces of sensors 11, 12, 13, 14 are advantageously developed in the form of wireless interfaces, in particular in the form of radio interfaces, Bluetooth interfaces, WLAN interfaces, and/or infrared interfaces. Evaluation unit 300 can be developed as a stationary mobile edge computing server.

Figure 2:
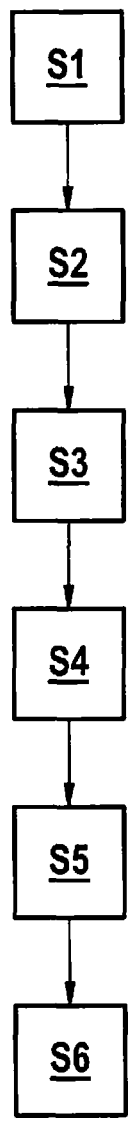
FIG. 2 is a flowchart that illustrates a method according to an example embodiment of the present invention.

The placement of sensors 11, 12, 13, 14 in the road surface of traffic lane 110 in FIG. 2 corresponds to step S1. In a step S2, the geographical position of each sensor 11, 12, 13, 14 will then be ascertained in the form of geo-referencing, and an allocation of the respective identification of sensors 11, 12, 13, 14 is performed in evaluation unit 300 in a suitable manner and in such a way that each sensor 11, 12, 13, 14 as well as its position is unequivocally identifiable by evaluation unit 300 on the basis of its overlap signal. In the example of FIG. 1, for example, the position of sensor 14 is sketched by the coordinates (x14, y14), whereby the position of sensor 14 is able to be indicated in a planar Cartesian reference coordinate system using corresponding orthogonal axes x, y. In a preferred example embodiment, the format of the positions of sensors 11, 12, 13, 14 corresponds to a geo-reference that is conventionally used for the control of highly automated vehicles (HOV) 201.

Figure 3:
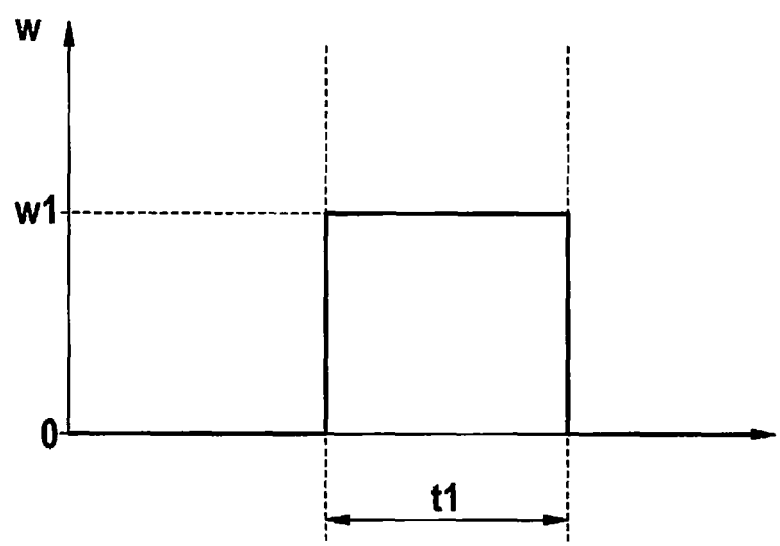
FIG. 3 illustrates an overlap signal according to an example embodiment of the present invention.

In step S3, sensors 11, 12, 13, 14 transmit their respective overlap signals to evaluation unit 300. The overlap signals can be transmitted in a variety of ways. As illustrated in FIG. 3, for example, it is conceivable that the overlap signal of respective sensors 11, 12, 13, 14 assumes a value "w1" only if, and for as long as, the corresponding sensor 11, 12, 13, 14 is overlapped by a dynamic object 200 that is located on the roadway surface of traffic lane 110. In the illustrated case, this occurs during period t1; in all other cases, the overlap signal has the value "0".

In an example embodiment, the overlap signal is transmitted to the evaluation unit at a specific frequency, e.g., 100 Hz, and the signal indicates a status as overlap or no overlap, i.e., "0" or "w1", during each transmission. In each case, evaluation unit 300 is able to gather from the overlap signal the information as to whether or not a dynamic object 200 happens to just then be located above sensor 11, 12, 13, 14.

In step S4, evaluation unit 300 ascertains at least the position of the at least one dynamic object 200 located in traffic lane 110 using the overlap signals in the form of a local environmental model of road section 110. In the example from FIG. 1, evaluation unit 300 ascertains the position of dynamic object 200 at the moment at which it can be gathered from the overlap signal from sensor 14 that it is currently overlapped by a dynamic object 200 located in the traffic lane, whereupon evaluation unit 300 allocates a dynamic object to the position (x14, y14) in the local environmental model.

All overlap signals received by evaluation unit 300 are handled in this manner, so that the local environmental model includes comprehensive information pertaining to dynamic objects 200 that are currently located in road section 100.

In step S5, the prepared local environmental model is transmitted in the form of a digital map to a highly automated vehicle (HOV) 201, which is not shown and is connected to evaluation unit 300 via its communications interface. In the example of FIG. 1, this can be dynamic object 200, which has been detected as dynamic object 200 in the traffic lane by sensor 14, for example. In such a case, a driver-assistance system of highly automated vehicle 201 is able to determine that dynamic object 200 located at the position (x14, y14) is dynamic object 200. This determination is made using suitable comparison algorithms and with the aid of localization information ascertained in some other manner, e.g., via GPS (global positioning system) or onboard sensors such as cameras. The position transmitted by evaluation unit 300 is thereby able to be utilized for adjusting the own movement trajectory or for ascertaining the own position.

To this extent, the method of the present invention in the specific example embodiment described above allows for an augmentation of the information from onboard ambient-environment sensors of highly automated vehicle 201 and thereby leads to a more robust configuration of the system provided for the incorporation of dynamic objects 200.

Figure 4:
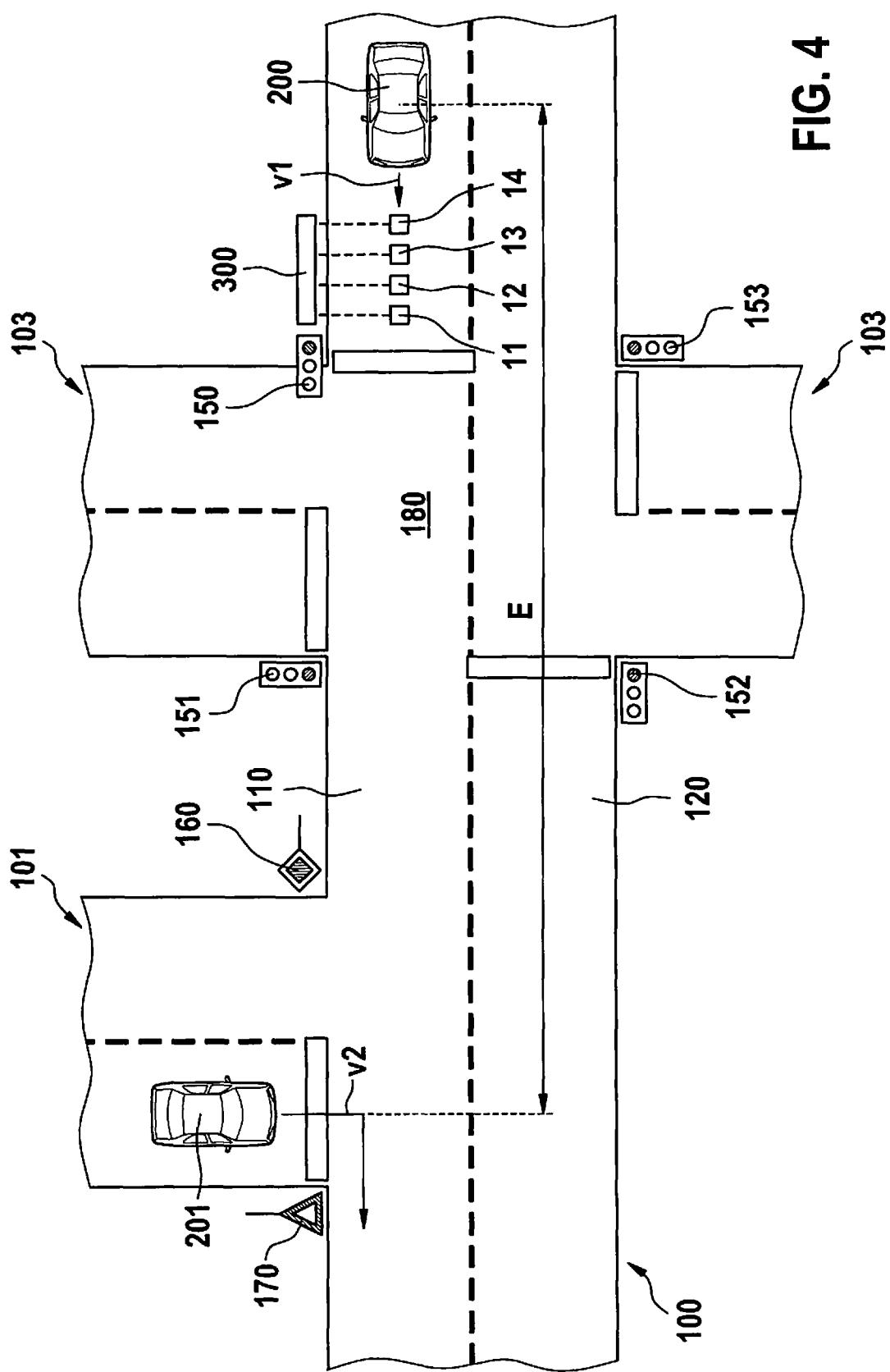
FIG. 4 is a view of a further road section in which the method of the present invention is used, according to an example embodiment of the present invention.

Another application possibility of the present invention will be described in the following text in connection with FIG. 4. FIG. 4 shows a traffic node 180, which is essentially formed by road section 100 and a second road section 103. In the region of traffic node 180, traffic lane 110 is equipped with sensors 11, 12, 13, 14 in the manner described in connection with FIG. 1. For reasons of clarity, not all features described in FIG. 1 are depicted in FIG. 4, but the corresponding comments in connection with FIGS. 1 through 3 are meant to apply in the same way here.

FIG. 4 also shows signal systems 150, 151, 152, 153 for controlling a traffic flow, which are generally simply known as traffic lights. Signal system 150 controls the traffic flow in traffic lane 110 by interrupting or allowing this traffic flow.

Adjacent to traffic node 180 is an intersection of a third road section 101 via which vehicles are able to enter traffic lane 110. In the illustrated case, a highly automated vehicle (HAV) 201 is located on road section 101. Its intended driving direction onto traffic lane 110 is indicated by an arrow v2.

A first traffic sign 170, which signals the right of way of the traffic located in traffic lane 110 with respect to the traffic exiting road section 101, (traffic sign No. 205 according to StVO (Road Traffic Act) "grant the right of way"), is located at the junction. This situation is signaled to a vehicle traveling in traffic lane 110 by a second traffic sign 160 (traffic sign No. 306 according to StVO (Road Traffic Act) "priority road").

In the example from FIG. 4, a dynamic object, whose speed and direction in traffic lane 11 are symbolized by arrow v1, is located on road section 100. Evaluation unit 300, proceeding in the manner already described with the aid of FIG. 1, ascertains the position of dynamic object 200 as soon as it drives over one of sensors 11, 12, 13, 14. According to this particular specific example embodiment, evaluation unit 300 also ascertains the velocity status of dynamic object 200 on the basis of the temporal sequence of the sensor-crossing events at sensors 11, 12, 13, 14. For instance, the velocity status of dynamic object 200 in the region of sensors 12 and 11 disposed one after the other can simply be determined in such a way that defined spacing A between sensors 12 and 11 is divided by a time period Δt, measured by evaluation unit 300, between the sensor-crossing events transmitted to evaluation unit 300 by sensors 12 and 11. The determination of the sensor-crossing events via sensors 12 and 11 is performed using the overlap signals of sensors 12 and 11 in the manner described above.

According to an example embodiment of the present invention, possible movement trajectories of object 200 located in traffic lane 110 are calculated in advance in space and time on the basis of the velocity status of dynamic object 200 and taking into account a course of traffic lane 110, known from digital maps, for example, as well as the applicable traffic rules at that location. For this purpose, for example, evaluation unit 300 transmits the positional and velocity information with regard to dynamic object 200 obtained in the afore-described manner to a driver-assistance system of HAV 201. With the aid of this information and on the basis of additional information such as the status of signal system 150 with regard to the traffic flow in traffic lane 110, as well as the right-of-way situation controlled by traffic signs 160, 170, the driver-assistance system of HAV 201, for example, is able to calculate whether merging with traffic lane 110 indicated by arrow v2 is currently possible without a risk or whether an adverse effect on traffic safety should be expected in such a merging operation on account of approaching dynamic object 200.

In an alternative example embodiment, the information with regard to the position and velocity of dynamic object 200 and signal system 150 as well as the right-of-way situation is also able to be evaluated by evaluation unit 300 itself and be included in the local environmental model. In this case, for example, movement trajectories of dynamic model 200 calculated in advance are able to be directly transmitted to the driver-assistance system of HAV 201.

In the specific example embodiment of FIG. 4, traffic node 180 is an intersection. In a similar manner, however, the method according to the present invention can also be used for pedestrian crossings, entry ramps to expressways, or in the region of exit ramps.

The present invention is not restricted to the described and illustrated exemplary embodiments. Instead, it also includes all further developments, within the framework of the invention, which can be ascertained by one skilled in the art based on the present disclosure.

In addition to the described and illustrated example embodiments, additional embodiments are conceivable, which can include further variations as well as combinations of features.

What is claimed is:

1. A method for generation of a digital map for a highly automated vehicle (HAV), the method comprising:

obtaining, by an evaluation unit and from each of a plurality of sensors in a roadway surface of a road section, a respective overlap signal (a) that is transmitted by the respective sensor via a respective communications interface of the respective sensor and (b) that includes a respective unique identification of the respective sensor and information as to whether the respective sensor is currently overlapped by any of at least one dynamic object being situated above the respective sensor on the roadway surface, wherein each of the plurality of sensors is associated with a respective geographical position, such that each sensor as well as its respective position is unequivocally identifiable on the basis of its respective overlap signal;

ascertaining, by the evaluation unit, a respective position of each of the at least one dynamic object situated on the roadway on the basis of the overlap signals in the form of a local environmental model of the road section; and transmitting, by the evaluation unit, the local environmental model to the HAV in the form of a digital map identifying the at least one dynamic object at one or more respective positions of the map corresponding to the ascertained at least one respective position.

2. The method of claim 1, wherein the sensors are surface-integrated magnetic-field sensors.

3. The method of claim 1, wherein at least one the communications interfaces is a wireless interface.

4. The method of claim 1, wherein at least one the communications interfaces is a radio interface.

5. The method of claim 1, wherein at least one the communications interfaces is a Bluetooth interface.

6. The method of claim 1, wherein at least one the communications interfaces is a WLAN interface.

7. The method of claim 1, wherein at least one the communications interfaces is an infrared interface.

8. The method of claim 1, wherein at least two of the sensors are placed in line one behind the other when viewed in a longitudinal direction of the road section.

9. The method of claim 8, wherein the ascertaining includes determining respective velocities of respective ones of one or more of the at least one dynamic object based on the overlap signals of the at least two sensors the temporal sequence of the overlap signals of the at least two sensors.

10. The method of claim 9, wherein the ascertaining includes, based on the velocities, a predefined course of the road section, predefined subdivision of the road section into traffic lanes, and predefines traffic rules prevailing at the road section, determining possible movement trajectories of one or more of the at least one dynamic object, in advance, with respect to space and time, of movements of the trajectories.

11. The method of claim 10, wherein the possible movement trajectories are incorporated into the environmental model.

12. The method of claim 1, wherein the road section is located in a region of a traffic node.

13. The method of claim 1, wherein the road section is located in a region of an intersection.

14. The method of claim 1, wherein the road section is located in a region of a pedestrian crossing.

15. The method of claim 1, wherein the road section is located in a region of an entry ramp to an expressway.

16. The method of claim 1, wherein the road section is located in a region of an exit.

17. The method of claim 1, wherein the evaluation unit is a mobile edge computing server.

18. The method of claim 1, wherein the evaluation unit is a stationary mobile edge computing server.

19. The method of claim 1, wherein the inclusion of the identifications of the at least one dynamic object in the digital map is performed further based on output of vehicle-internal sensors disposed on the HAV.

20. A non-transitory computer-readable medium on which are stored instructions that are executable by a processor and that, when executed by the processor, cause the processor to perform a method for generation of a digital map for a highly automated vehicle (HAV), the method comprising:

obtaining, from each of a plurality of sensors in a roadway surface of a road section, a respective overlap signal (a) that is transmitted by the respective sensor via a respective communications interface of the respective sensor and (b) that includes a respective unique identification of the respective sensor and information as to whether the respective sensor is currently overlapped by any of at least one dynamic object being situated above the respective sensor on the roadway surface, wherein each of the plurality of sensors is associated with a respective geographical position, such that each sensor as well as its respective position is unequivocally identifiable on the basis of its respective overlap signal;

ascertaining a respective position of each of the at least one dynamic object situated on the roadway on the basis of the overlap signals in the form of a local environmental model of the road section; and transmitting the local environmental model to the HAV in the form of a digital map identifying the at least one dynamic object at one or more respective positions of the map corresponding to the ascertained at least one respective position.

* * * * *